United States Patent [19]

Andersson

[11] 4,286,724

[45] Sep. 1, 1981

[54] FLUID TANK ARRANGEMENT WITH CLOSURE

[76] Inventor: Ivan Andersson, Hänavägen 23,, 826 04 Söderhamn, Sweden

[21] Appl. No.: 117,491

[22] PCT Filed: Oct. 26, 1978

[86] PCT No.: PCT/SE78/00065

§ 371 Date: Jun. 28, 1979

§ 102(e) Date: Jun. 25, 1979

[87] PCT Pub. No.: WO79/00241

PCT Pub. Date: May 3, 1979

[30] Foreign Application Priority Data

Oct. 28, 1977 [SE] Sweden ................................ 7712169

[51] Int. Cl.³ .................... B65D 1/24; B65D 1/36; B65D 57/00
[52] U.S. Cl. ..................................... 220/20.5; 220/20; 220/23; 137/571
[58] Field of Search ................. 220/200, 20, 23, 20.5, 220/86 R; 137/571, 575, 576

[56] References Cited

U.S. PATENT DOCUMENTS 1,400,727  12/1921  Codd ..................................... 137/571
2,971,576  2/1961   Anker .............................. 137/571 X Primary Examiner—George T. Hall
Attorney, Agent, or Firm—Cohn, Powell & Hind

[57] ABSTRACT

A fluid tank arrangement of the kind adapted to deliver a fluid to a consumption unit and comprising a reserve fluid container (16), which is operable to deliver the reserve fluid into the tank (3) when the fluid in the tank has been consumed, said container being arranged in association with a filling hole (4) in the tank. According to the invention, it is proposed that said container is combined with a cap (1) for the filling hole in the tank so as to compulsorily follow the cap when it is removed from and replaced onto the tank and that the container, when containing said reserve fluid, is adapted to retain the reserve fluid independently of the position of the cap and tank. The container is preferably an absorption element.

11 Claims, 3 Drawing Figures

U.S. Patent   Sep. 1, 1981   4,286,724
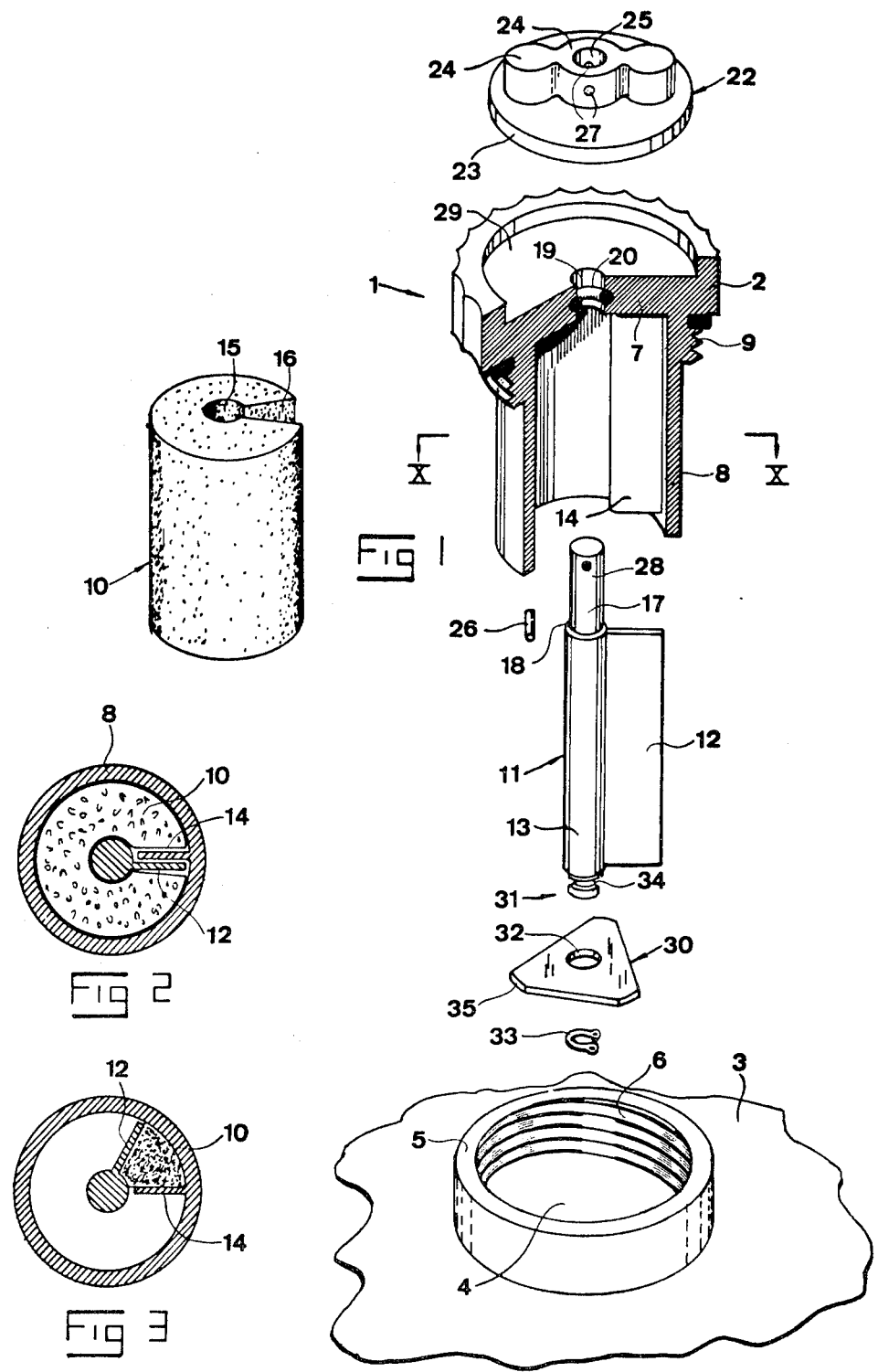

FLUID TANK ARRANGEMENT WITH CLOSURE

TECHNICAL FIELD

This invention is related to a fluid tank arrangement of the kind adapted to deliver a fluid to a consumption unit and comprising a reserve fluid container, which is operable to deliver the reserve fluid into the tank when the fluid in the tank has been consumed, said container being arranged in association with a filling hole in the tank.

BACKGROUND ART

An arrangement of this kind is disclosed in the French Pat. No. 1,372,018. In this arrangement, the reserve fluid container is permanently secured in a hole in a fluid tank. A cap is intended to be put onto the upper part of the container to close the tank. A valve is provided to open and close respectively an opening in the lower part of the container. In the mantle of the container, there are provided openings continuously open into the tank. When fluid is filled into the hole in the tank, the fluid will flow down into the container and when the container is filled the fluid will flow out through the openings in the mantle and into the tank. This arrangement is unsuitable for certain applications, e.g. for portable power saws used in the forest industry. Manufacturers of power saws constantly aim at keeping the weight of the power saws as low as possible and a.o. the saws are provided with comparatively small fuel tanks, which have to be refilled frequently. A forest worker is often occupied with the felling of a tree when the fuel in the power saw is consumed and the same stops. At that time, the tree may be sawn off half ways or more. The forest worker must now refill the fuel tank and to do this he must move with the saw to a fuel supply, which may be located at a considerable distance from said tree. When the forest worker is moving to and away from the fuel supply and refilling the saw, the tree is left partially sawn off without observation and a puff of wind may be sufficient to get the tree to fall. Other workers near the tree or the first mentioned forest worker himself may accordingly be the subject of an obvious risk of getting hurt or killed. The arrangement according to said French patent specification is unsuitable to be used on a portable power saw since it is not possible for the worker to conveniently establish whether the container is capable of retaining the reserve fuel. Even if the valve is only slightly untight, a leakage will occur and it may happen that no reserve fuel is at hand in a critical situation. Furthermore, the reserve fuel in the container will simply flow out of the container through the openings in the mantle if the tank would be inclined or inverted.

DISCLOSURE OF INVENTION

The object of the invention is to eliminate said disadvantages and provide a simple and efficient arrangement applicable on portable power saws or the like.

This object is achieved in that said container is combined with a cap for the filling hole in the tank so as to compulsorily follow the cap when it is removed from and replaced onto the tank and that the container, when it containing said reserve fluid, is adapted to retain the reserve fluid independently of the position of the cap and tank. By this solution an efficient safety arrangement for e.g. portable power saws is obtained. Since the container is incorporated into the cap for the fluid tank, the tightness of the container and the function of an operating means for the container can be readily checked when the tank is refilled. If the filled container would leak, such leakage would immediately be observed by the worker since the container compulsorily must be removed from the tank with the cap and since the container often will be full when refilling the tank due to the fact that the container fluid normally will be used only if the fluid in the tank has been consumed in a critical phase. It is important that the arrangement according to the invention does not cause any additional difficulties for the worker when the arrangement is not used to deliver fluid. That the container is connected to the cap is an important advantage from the point of view of manufacture and costs. The ability of the container to retain the reserve fluid independently of the position of the cap and tank makes it possible to apply the invention on a portable power saw, which normally is turned and rotated, without jeopardizing the safety function of the arrangement.

According to a preferred embodiment, the container is an absorption element, which is compressible by an operating means of the cap to squeeze out the reserve fluid.

BRIEF DESCRIPTION OF DRAWINGS

With reference to the appended drawings, a more specific description of the invention will follow hereinafter.

In the drawings;

FIG. 1 is a perspective, exploded and partially sectioned view of the arrangement according to the invention; and FIGS. 2 and 3 are sections taken along line X—X in FIG. 1 and illustrating the arrangement in different operational states.

BEST MODE OF CARRYING OUT THE INVENTION

The arrangement according to the invention will now be described as incorporated into a cap for a filling hole in the fuel tank. The fuel tank will hereinafter be considered as pertaining to a portable power chain saw.

In FIG. 1, a cap is generally denoted 1. The cap has a peripherical, serrated portion 2 to simplify rotation of the cap by hand. A part of a fuel tank 3 is indicated and has a filling hole 4 surrounded by a projecting, circular flange 5 provided with an internal thread 6. The cap 1 has a mantle 8 protruding from a base part 7 of the cap. Said mantle is adapted to project into the interior of tank 3 when the cap is put onto the tank and the mantle is on the outside close to base part 7 provided with a thread 9 to engage thread 6 of flange 5.

The cap includes a container 10 for reserve fuel and said container is arranged to be filled when placing cap 1 onto the tank. Said container can be operated to deliver the reserve fuel into the tank. The container 10 is formed as an absorption element, which is compressible by an operating means 11 to squeeze out the fuel absorbed by the absorption element.

The absorption element 10 may consist of a porous, elastic and flexible material, especially polyester foam. The absorption element 10 has a generally cylindrical form and is adapted to be housed within the cross sectionally circular mantle 8. The operating means 11 comprises a vane 12, which is rotatable to and fro within the mantle 8 and the axis 13 of rotation of which is generally concentric to mantle 8.

At the inside of mantle 8, there is provided a partition 14 extending essentially axially and radially inwardly. The extent of the mantle in axial direction essentially corresponds to the extent of vane 12 in axial direction and the partition projects inwardly so that the inner edge thereof is located near the axis 13 of rotation of vane 12. The absorption element 10 has a central, axial through opening 15 to receive the pin forming the axis of rotation of vane 12 and a slot 16 extending radially from opening 15 to receive vane 12 and partition 14.

The shaft or pin 13 of vane 12 comprises a portion 17 having a smaller diameter than the portion of said pin extending along vane 12. Between said portions there is formed an axially facing surface 18. The portion 17 of pin 13 is adapted to protrude through a hole 19 provided in the base part 7 of cap 1. Said hole has such a diameter that the surface 18 may abut the lower side of base part 7 and prevent additional axial displacement of pin 13 toward base part 7 when the arrangement is assembled. In the wall of hole 19, a groove is provided and housing a sealing ring 20 to seal against portion 17. The part of portion 17 projecting past the hole 19 is adapted to be received in a hole in a wheel 22. Said wheel comprises a disc shaped part 23 and a grip part 24 formed thereon. The grip part 24 serves to simplify rotation of wheel 22 and has a wall 25 surrounding the hole. The pin 13 and wheel 22 are adapted to be rigidly connected by a pin 26, which may be inserted through two aligned holes 27 in wall 25 and a hole 28 in the portion 17 of pin 13.

At the end facing away from mantle 8, the cap 1 has a cylindrical recess 29 to receive the disc shaped part 23.

At the end facing away from base part 7, the pin 13 is detachably securable to a guide means 30 movable along the inside of mantle 8. Said guide means serves to center pin 13 relative to the mantle and retain the absorption element. The pin 13 is insertable with its end 31 into a hole 32 in the guide means, which may be locked by a ring 33 engaging a groove 34 in the pin 13 and, when the guide means is mounted, being located below the guide means. The guide means 30 may be generally triangular and may have circularly curved corners 35, a circel coinciding with the curved corners 35 having a diameter essentially corresponding to the inside diameter of mantle 8. The guide means 30 will be located just underneath the partition 14 and engage the inside of the mantle as viewed in FIG. 1.

In FIG. 2, the normal or expanded state of the absorption element 10 within mantle 8 is illustrated. The vane 12 and partition 14 are located generally parallel to each other and are somewhat displaced on either side of an axial plane through the mantle 8 and parallel to vane 12 and partition 14.

In FIG. 3, the absorption element 10 is illustrated in its compressed state between the vane 12 and partition 14.

OPERATION

The arrangement according to the invention is used in the following manner: It is assumed that the absorption element 10 is in its expanded state and contains absorbed fuel and that a forest worker uses the power chain saw for felling and processing trees. If the fuel within the tank 3 terminates during the felling of a tree, the forest worker only has to rotate the operating wheel 22 and possibly start the saw again if it has stopped, and then the felling of said tree may be completed. When rotating the wheel 22, the vane 12 and absorption element 10 are manoeuvered into the state illustrated in FIG. 3, in which the absorption element 10 is compressed between vane 12 and partition 14. During this compression movement, absorbed fuel is squeezed out of the absorption element and the fuel flows past guide means 30 between the corners 35 thereof, out through the open end of mantle 8 and into the interior of tank 3. When the vane 12 has been moved into the position in FIG. 3, the wheel 22 may simply be released, whereafter the elastic absorption element 10 expands and automatically moves vane 12 into the position in FIG. 2 and assumes the state illustrated in said Figure. When the felling of said tree has been completed, the forest worker may undisturbed refill the tank 3 with fuel through the filling hole 4 uncovered after screwing away cap 1. When the tank 3 has been refilled, the cap 1 is replaced on the filling hole and during the replacement movement and the screwing operation performed thereafter, fuel flows in through the open end of mantle 8 and is absorbed by the absorption element. The forest worker may then continue his activity and handle the power saw in any manner desired; the fuel in the absorption element is retained under all circumstances. If the fuel again terminates during a critical phase, only a renewed screwing of wheel 22 is required, etc.

After a longer period of use, the absorption element 10 may be exchanged by detaching the ring 33, removing guide means 30, withdrawing the absorption element and inserting a new absorption element in the axial direction of mantle 8.

The absorption element may be designed for containing arbitrary fluid quantities by proper selection of the volume of the element. When used in association with portable power saws, the absorption element may be arranged to absorb and contain comparatively samll reserve fuel quantities. In practice, a fuel quantity about 3–5 cm$^3$ normally is sufficient to enable the forest worker to complete the felling of a tree already partially sawn off. Preferably, the fuel quantity in the absorption element should not be so large that the worker can continue to fell one or more additional trees by the supply of the reserve fuel. The reserve fuel quantity should normally be measured to only somewhat more than the felling of a big tree.

POSSIBLE MODIFICATIONS

The invention is in no way limited to the embodiment disclosed. Thus, the invention is applicable in other connections than with saws. The absorption element may in that case be adapted to absorb and contain other fluids than fuel. The absorption element may be produced by any absorbing material suitable for the purpose, although polyester foam during prolonged tests has proved to have the required absorption qualities and a sufficient resistance to the abrasion occurring during compression and expansion without being desintegrated. The material of the absorption element must be compatible to the fluid; polyester foam has proved resistant during prolonged contact with gasoline. In some cases, it may, however, be suitable to at least partially enclose the absorption element in a coating of a flexible, abrasion resistant material, especially plastics film. This coating must be apertured if it completely encloses the absorption element. Instead of the rotatable vane 12, a piston movable in a straight line may be used and in that case the piston or the mantle may be provided with openings to allow fluid passage into and out of the absorption element, the partition 14 not being necessary. The absorption element and the mantle may have another section form, e.g. oval or polygonal, instead of circular. It is possible to use more than one absorption element. If the absorption element should be more or less plastic, one or more springs, e.g. engaging between base part 7 and wheel 22, may be provided to return vane 12 to the position in FIG. 2. It is also possible to bond the absorption element to vane 12 and/or partition 14. Finally, it is possible to use a container in the form of a hollow, rigid receptacle instead of a flexible absorption element. In that case, the receptacle can be movable between two positions within the mantle of the cap, namely a first position, in which the receptacle communicates with the inside of the tank via holes in the receptacle wall and the mantle, and a second position, in which the receptacle is completely sealed relative to the inside of the tank so that the fluid may be retained in the receptacle independently of the position of the tank. In the latter position, the holes in the receptacle wall and the mantle are not aligned. Alternatively, a valve means may be provided to, in one position, allow fluid flow into and out of the receptacle and, in a second position, completely seal the receptacle from the inside of the tank.

What I claim is:

1. A fluid tank arrangement of the kind to deliver a fluid to a consumption unit and comprising a reserve fluid container (16), which is operable to deliver the reserve fluid into the tank (3) when the fluid in the tank has been consumed, said container being arranged to be located in association with a filling hole (4) in the tank, characterized in that said container is combined with a cap (1) for the filling hole in the tank so as to compulsorily follow the cap when it is removed from and replaced onto the tank and that the container is compressible and of a dimension smaller than the filling hole so that, when containing said reserve fluid, is adapted to retain the reserve fluid independently of the position of the cap and the tank.

2. In a fluid tank arrangement of the type adapted to deliver a fluid to a consumption unit and including a detachable cap for said fluid tank; the invention comprising a reserve fluid container within said fluid tank, operable to deliver the reserve fluid into the tank when the fluid in the tank has been consumed, and means forming said reserve fluid container adapted to retain the reserve fluid therein independently of the position of the fluid tank and the reserve fluid container, said reserve fluid container including an absorption element, and means for compressing said element to squeeze out the reserve fluid contained therein.

3. Arrangement according to claim 2, characterized in that the absorption element (10) consists of a porous flexible plastics material.

4. Arrangement according to claim 2, characterized in that the operating means (11) is springloaded to a position, in which the absorption element is uncompressed.

5. Arrangement according to claim 2, characterized in that the absorption element (10) is at least partially surrounded by a coating of a flexible abrasion resistant material.

6. Arrangement according to claim 2, characterized in that the absorption element is arranged within a mantle (8) and that said operating means comprises a piston (12), which is movable to and fro within the mantle.

7. Arrangement according to claim 6, characterized in that said piston comprises a rotatable vane (12), the axis of rotation (13) of which is generally concentric to the mantle (8).

8. Arrangement according to claim 7, characterized in that within the mantle, there is provided a partition (14) extending in the axial direction of the mantle and radially inwardly therefrom, said partition having an axial and radial extent essentially corresponding to the corresponding extent of the vane (12), and that the absorption element (10) is essentially cylindrical and has a central axial opening (15) for receiving the axis (13) of rotation of the vane and a slot (16) extending radially from the opening and adapted to receive the partition and vane.

9. Arrangement according to claim 7, characterized in that the axis (13) of rotation is detachably connected to a guide means (30) adapted to abut the inside of the mantle to center the axis of rotation relative to the mantle.

10. Arrangement according to claim 9, characterized in that said guide means (30) is generally triangular with curved corners (35).

11. The invention according to claim 2 in which said reserve fluid container is secured to said cap and depends therefrom into said fluid tank, when said cap is installed upon said fluid tank, said reserve fluid container being removable with said cap when said cap is removed from said fluid tank.

* * * * *